(12) United States Patent
Wang

(10) Patent No.: US 11,486,437 B2
(45) Date of Patent: Nov. 1, 2022

(54) BUOYANT FASTENER STRUCTURE

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 407 days.

(21) Appl. No.: 16/729,491

(22) Filed: Dec. 30, 2019

(65) Prior Publication Data

US 2020/0208674 A1 Jul. 2, 2020

(30) Foreign Application Priority Data

Jan. 2, 2019 (TW) ................................ 108200035

(51) Int. Cl.
*F16B 39/28* (2006.01)

(52) U.S. Cl.
CPC ................................. *F16B 39/28* (2013.01)

(58) Field of Classification Search
CPC .......... F16B 39/08; F16B 39/10; F16B 39/28; Y10S 411/925–926
USPC ......................................... 411/204, 214, 276
See application file for complete search history.

(56) References Cited

U.S. PATENT DOCUMENTS

| | | | | |
|---|---|---|---|---|
| 3,187,796 A | * | 6/1965 | Double | F16B 37/068 411/181 |
| 2006/0099048 A1 | * | 5/2006 | Ward | B21K 1/70 411/432 |
| 2010/0119324 A1 | * | 5/2010 | Townson | F16B 37/068 411/180 |
| 2014/0017028 A1 | * | 1/2014 | McKinlay | F16B 41/002 411/149 |
| 2014/0186134 A1 | * | 7/2014 | Lin | F16B 39/282 411/204 |
| 2015/0285293 A1 | * | 10/2015 | Kawakami | F16B 39/12 411/204 |

* cited by examiner

*Primary Examiner* — Roberta S Delisle

(57) ABSTRACT

A buoyant fastener structure includes a body portion and a fastening element. The body portion has a rotation-preventing portion and a position-limiting portion. The fastening element has a position-corresponding rotation-preventing portion, a position-corresponding position-limiting portion and a fastening portion. The rotation-preventing portion and the position-corresponding rotation-preventing portion prevent each other from rotating. A rotation-preventing buoyancy level exists between the rotation-preventing portion and the position-corresponding rotation-preventing portion. The position-limiting portion corresponds in position to and limits the position of the position-corresponding position-limiting portion. Therefore, the body portion is coupled to a first object, whereas the fastening portion is coupled to or removed from a second object, so as for the first and second objects to be coupled together and separated, repeatedly and quickly. Furthermore, the second object coupled to the first object is movable on the fastening element to adjust the position of the second object.

15 Claims, 7 Drawing Sheets

(a)

(b)

(c)

(d)

(e)

BUOYANT FASTENER STRUCTURE

CROSS-REFERENCE TO RELATED APPLICATION

This non-provisional application claims priority under 35 U.S.C. § 119(a) on Patent Application No(s). 108200035 filed in Taiwan, R.O.C. on Jan. 2, 2019, the entire contents of which are hereby incorporated by reference.

BACKGROUND OF THE INVENTION

1. Field of the Invention

The present disclosure relates to buoyant fastener structures, and in particular to a buoyant fastener structure for coupling together and separating at least one object repeatedly and quickly and allowing a coupled object to move on a fastening element to adjust the position of the object.

2. Description of the Related Art

Conventionally, coupling together at least one object entails fastening it with a screw.

However, the aforesaid conventional fixation technique has a drawback: although it fixes at least one object in place in an inseparable way, it not only causes difficulty in assembly, but its screw-based fixation requirement also causes difficulty in demounting the at least one object and renders adjustment-oriented movement thereof impossible.

Therefore, it is important to provide a buoyant fastener structure for coupling together and separating at least one object repeatedly and quickly and allowing a coupled second object to move on a fastening element to adjust the position of the second object.

BRIEF SUMMARY OF THE INVENTION

An objective of the present disclosure is to provide a buoyant fastener structure for coupling together and separating at least one object repeatedly and quickly and allowing a coupled second object to move on a fastening element to adjust the position of the second object.

To achieve at least the above objective, the present disclosure provides a buoyant fastener structure comprising a body portion and a fastening element, the body portion having a rotation-preventing portion and a position-limiting portion, the fastening element having a position-corresponding rotation-preventing portion, a position-corresponding position-limiting portion and a fastening portion, wherein the rotation-preventing portion and the position-corresponding rotation-preventing portion prevent each other from rotating, and a rotation-preventing buoyancy level exists between the rotation-preventing portion and the position-corresponding rotation-preventing portion, allowing the position-limiting portion to correspond in position to and limit the position of the position-corresponding position-limiting portion.

Regarding the buoyant fastener structure, a position-limiting buoyancy level exists between the position-limiting portion and the position-corresponding position-limiting portion.

Regarding the buoyant fastener structure, the rotation-preventing portion is a recess which the position-corresponding rotation-preventing portion is disposed in.

Regarding the buoyant fastener structure, the position-corresponding position-limiting portion has a stopping portion, and the body portion has a position-corresponding stopping portion, allowing the stopping portion to stop and limit the position of the position-corresponding stopping portion.

Regarding the buoyant fastener structure, the stopping portion is deformed under an applied force to interfere with the position-corresponding stopping portion.

Regarding the buoyant fastener structure, a stopping element is disposed between the stopping portion and the position-corresponding stopping portion and stopped at the position-corresponding stopping portion, or the stopping portion has a stopping element stopped at the position-corresponding stopping portion.

Regarding the buoyant fastener structure, the body portion has a fitting portion for being fitted to a first object.

Regarding the buoyant fastener structure, the fitting portion is fitted to the first object by riveting, fastening, locking, expanding or welding, so as to fit the body portion to the first object.

Regarding the buoyant fastener structure, the fitting portion has a material-storage space, and material of the first object is squeezed and thus flows into or enters the material-storage space as soon as an applied force is applied to the body portion, so as to fit the body portion and the first object together.

Regarding the buoyant fastener structure, the fitting portion is deformed under an applied force and thereby engaged with the first object, so as to fit the body portion and the first object together.

Regarding the buoyant fastener structure, the fitting portion is dented, raised, grooved, flat, arcuate, oblique, stepped or round.

Regarding the buoyant fastener structure, the buoyant fastener structure is held in a carrier but can be taken out of the carrier with a tool to fit to a first object.

Regarding the buoyant fastener structure, the first object is a metal board, a printed circuit board (PCB) or a plastic board.

Regarding the buoyant fastener structure, after being taken out with the tool, the buoyant fastener structure to be fitted to the first object has its required position computed by a position-corresponding device, and then information about the required position is transmitted to the tool to allow the tool to precisely place the buoyant fastener structure at a fitting position for the first object.

Regarding the buoyant fastener structure, the position-corresponding device is a vision comparison device or an image comparison device.

Regarding the buoyant fastener structure, the buoyant fastener structure has a weldable surface for being welded to the first object.

Regarding the buoyant fastener structure, the rotation-preventing buoyancy level and the position-limiting buoyancy level are equal or different.

Regarding the buoyant fastener structure, the rotation-preventing buoyancy level ranges from 0.01 mm to 10 mm.

Regarding the buoyant fastener structure, the position-limiting buoyancy level ranges from 0.01 mm to 10 mm.

Regarding the buoyant fastener structure, the fastening portion is a nut, outer thread, post, outer fastening member or inner fastening member.

Regarding the buoyant fastener structure, the stopping portion has a material-storage space, and material of the stopping element is squeezed and thus flows into or enters the material-storage space as soon as an applied force is applied to the fastening element, so as for the fastening element to movably fit to the body portion.

Regarding the buoyant fastener structure, the body portion has a squeezing portion whereby the material of the first object is squeezed and thus flows into or enters the material-storage space.

Regarding the buoyant fastener structure, the fastening element has a squeezing portion whereby the material of the stopping element is squeezed and thus flows into or enters the material-storage space.

Therefore, a buoyant fastener structure of the present disclosure is effective in coupling together a body portion and a first object and coupling together or separating a fastening portion and a second object to not only couple together and separate the first and second objects repeatedly and quickly but also allow the coupled second object to move on a fastening element and thereby adjust the position of the second object.

DETAILED DESCRIPTION OF THE INVENTION

Figure 1:
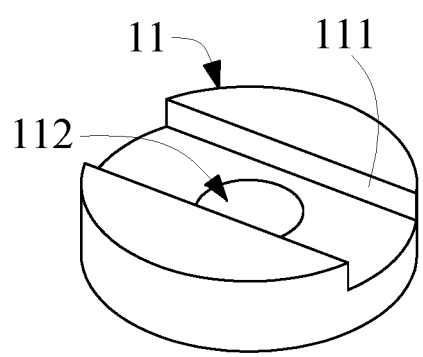
FIG. 1 is a perspective view of a body portion in the first embodiment of the present disclosure.

To facilitate understanding of the object, characteristics and effects of this present disclosure, embodiments together with the attached drawings for the detailed description of the present disclosure are provided.

Referring to FIG. 1 through FIG. 7, the present disclosure provides a buoyant fastener structure 1 comprising a body portion 11 and a fastening element 12. The body portion 11 has a rotation-preventing portion 111 and a position-limiting portion 112. The fastening element 12 has a position-corresponding rotation-preventing portion 121, a position-corresponding position-limiting portion 122 and a fastening portion 123. The rotation-preventing portion 111 and the position-corresponding rotation-preventing portion 121 prevent each other from rotating. A rotation-preventing buoyancy level a exists between the rotation-preventing portion 111 and the position-corresponding rotation-preventing portion 121. The position-limiting portion 112 corresponds in position to and limits the position of the position-corresponding position-limiting portion 122. A position-limiting buoyancy level b exists between the position-limiting portion 112 and the position-corresponding position-limiting portion 122.

In order for the buoyant fastener structure 1 to start working, the body portion 11 is place on a first object 2, and the fastening portion 123 of the fastening element 12 is coupled to or separated from a second object 3, so as to couple together and separate the first and second objects 2, 3 repeatedly and quickly. After the second object 3 and the fastening portion 123 have been coupled together, the rotation-preventing buoyancy level a and the position-limiting buoyancy level b enable the second object 3 to move on the fastening element 12 to thereby adjust the position of the second object 3 (as shown in FIG. 6).

Figure 5:
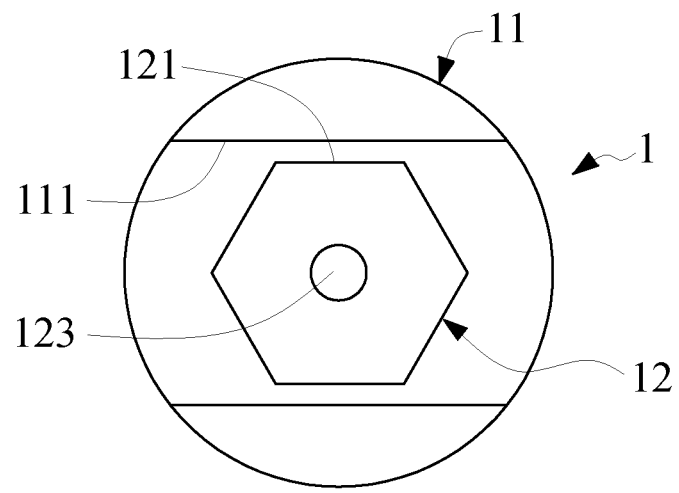
FIG. 5 is a top view of the first embodiment of the present disclosure.

In a preferred embodiment of the present disclosure, the rotation-preventing portion 111 is a recess which the position-corresponding rotation-preventing portion 121 is disposed in (as shown in FIG. 1 and FIG. 5). Therefore, the body portion 11 and the fastening element 12 are coupled together firmly.

Figure 2:
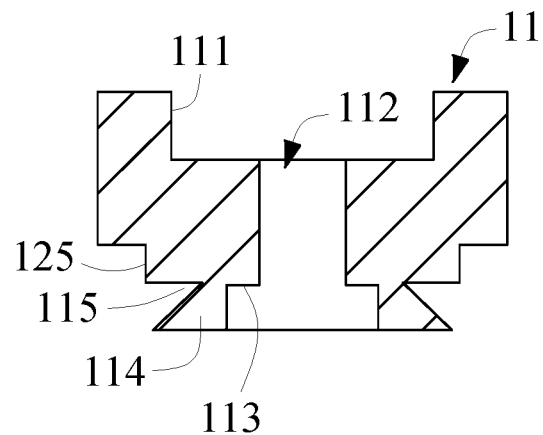
FIG. 2 is a cross-sectional view of the body portion in the first embodiment of the present disclosure.
Figure 3:
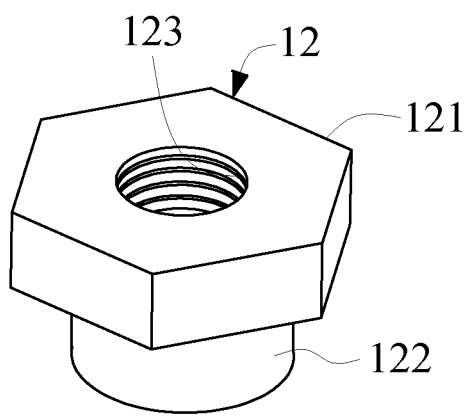
FIG. 3 is a perspective view of a fastening element in the first embodiment of the present disclosure.
Figure 4:
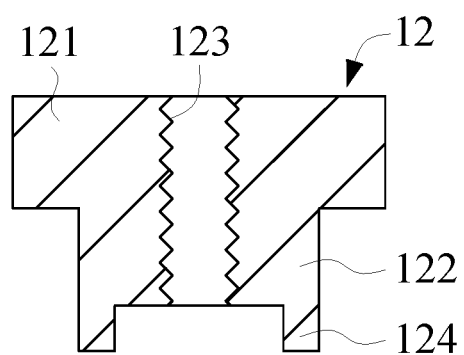
FIG. 4 is a cross-sectional view of the fastening element in the first embodiment of the present disclosure.

In a preferred embodiment of the present disclosure, the position-corresponding position-limiting portion 122 has a stopping portion 124, and the body portion 11 has a position-corresponding stopping portion 113. The stopping portion 124 is stopped at the position-corresponding stopping portion 113 to limit the position thereof (as shown in FIG. 2, FIG. 4 and FIG. 6). Therefore, the body portion 11 and the fastening element 12 are coupled together firmly.

Figure 6:
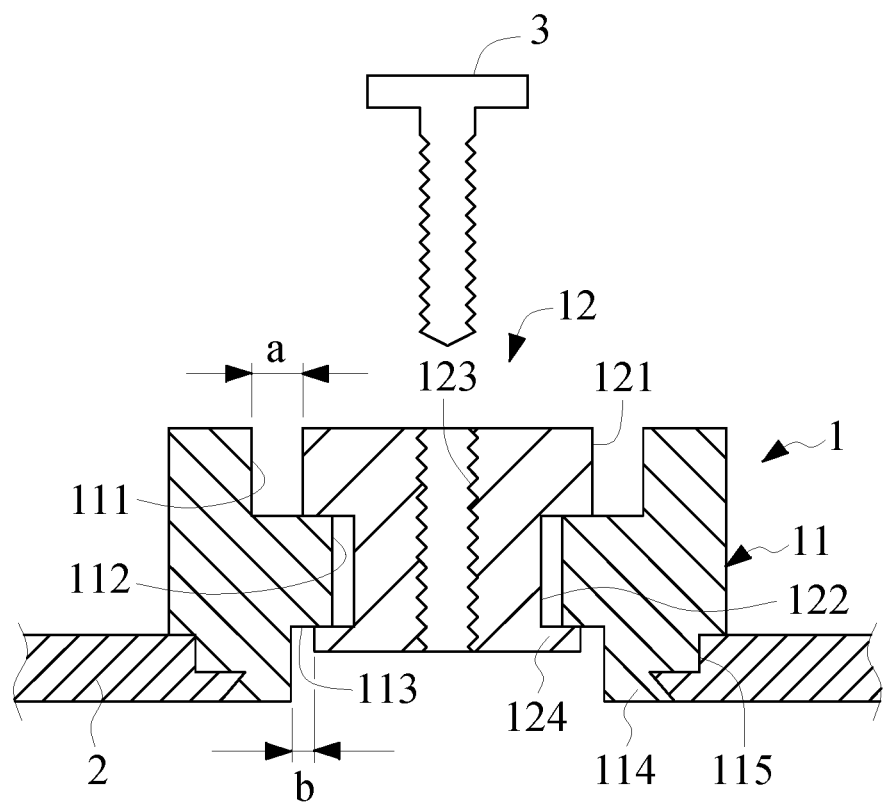
FIG. 6 is a schematic view of how to operate the first embodiment of the present disclosure.

In a preferred embodiment of the present disclosure, the stopping portion 124 is deformed under an applied force to interfere with the position-corresponding stopping portion 113 (as shown in FIG. 2, FIG. 4 and FIG. 6). Therefore, the body portion 11 and the fastening element 12 are coupled together firmly.

Figure 7:
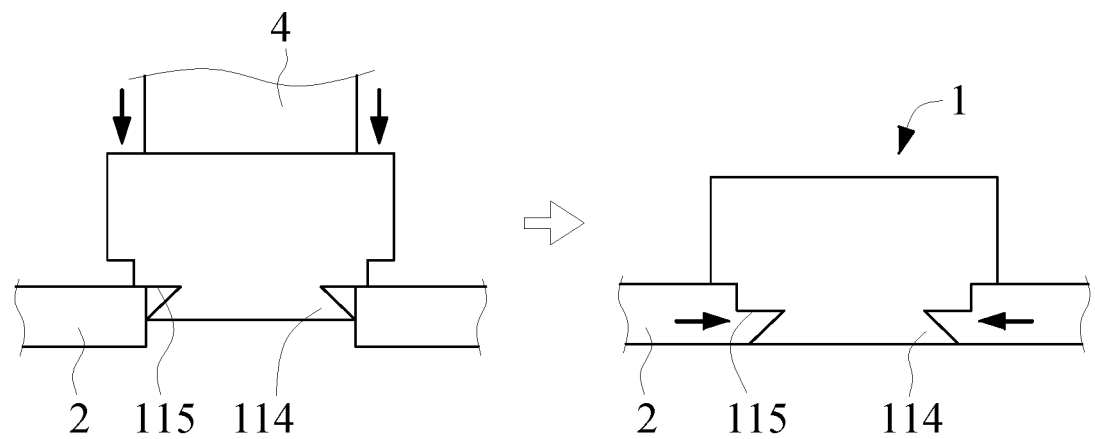
FIG. 7 is a schematic view of how to assemble the first embodiment of the present disclosure.

In a preferred embodiment of the present disclosure, the body portion 11 has a fitting portion 114 for fitting to the first object 2 (as shown in FIG. 6 and FIG. 7). The fitting portion 114 dented, raised, grooved, flat, arcuate, oblique, stepped or round. The fitting portion 114 is fitted to the first object 2 by riveting, fastening, locking, expanding or welding, so as to fit the body portion 11 to the first object 2 firmly.

In a preferred embodiment of the present disclosure, the fitting portion 114 of the body portion 11 has a material-storage space 115, and material of the first object 2 is squeezed and thus flows into or enters the material-storage space 115 as soon as an applied force exerted by a die 4 is applied to the body portion 11, so as to fit the body portion 11 and the first object 2 together firmly (as shown in FIG. 6 and FIG. 7). Alternatively, the body portion 11 has a squeezing portion (not shown) whereby the material of the first object is squeezed and thus flows into or enters the material-storage space 115. Hence, the present disclosure meets practical needs.

In a preferred embodiment of the present disclosure, the first object is a metal board, a printed circuit board (PCB) or a plastic board. Therefore, the buoyant fastener structure 1 is applicable to the first object 2 regardless of any possible variations therein, so as to meet practical needs.

In a preferred embodiment of the present disclosure, the rotation-preventing buoyancy level a and the position-limiting buoyancy level b are equal or different. Therefore, the second object 3 can float above the fastening element 12 as needed, so as to adjust the position of the second object 3.

In a preferred embodiment of the present disclosure, the rotation-preventing buoyancy level a ranges from 0.01 mm to 10 mm, and the position-limiting buoyancy level b ranges from 0.01 mm to 10 mm. Therefore, the second object 3 can float above the fastening element 12 as needed, so as to adjust the position of the second object 3.

Figure 8:
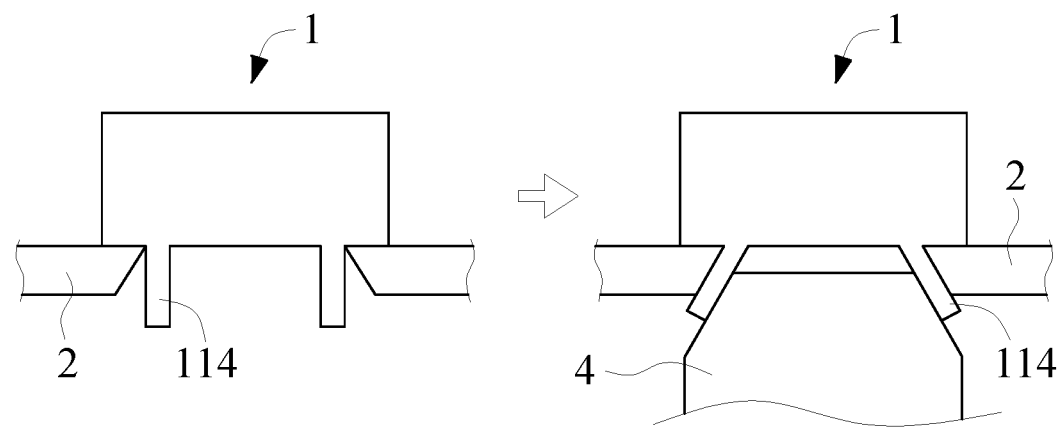
FIG. 8 is a schematic view of how to assemble the second embodiment of the present disclosure.

Referring to FIG. 8, in a preferred embodiment of the present disclosure, the fitting portion 114 is deformed under an applied force (exerted by a die 4) and then engaged with the first object 2, allowing the body portion 11 to be firmly fitted to the first object 2.

Figure 9:
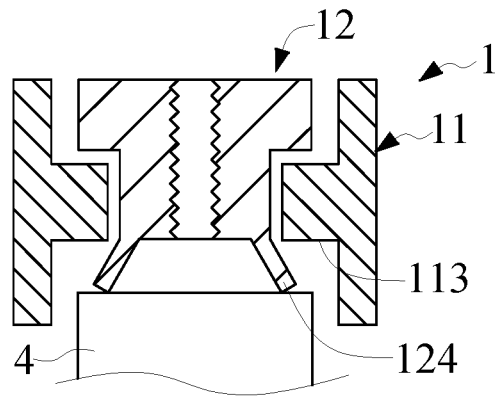
FIG. 9 is a schematic view of how to assemble the third embodiment of the present disclosure.

Referring to FIG. 9, in a preferred embodiment of the present disclosure, the stopping portion 114 is deformed under an applied force (exerted by a die 4) to therefore interfere with the position-corresponding stopping portion 124. Therefore, the body portion 11 and the fastening element 12 are firmly coupled together.

Figure 10:
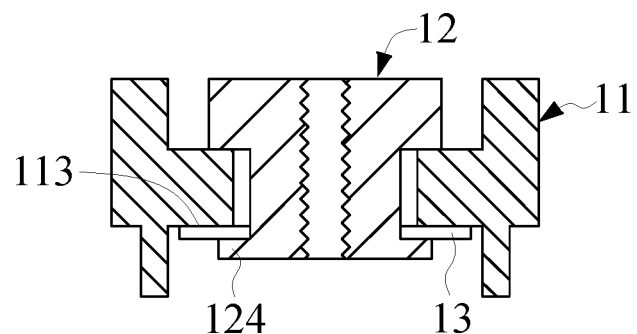
FIG. 10 is a cross-sectional view of the fourth embodiment of the present disclosure.
Figure 11:
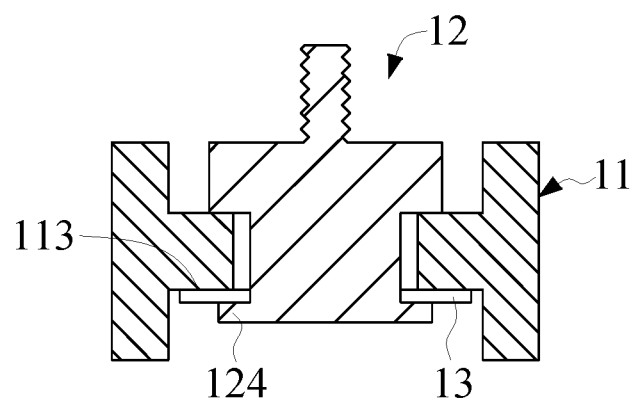
FIG. 11 is a cross-sectional view of the fifth embodiment of the present disclosure.

Referring to FIG. 10 and FIG. 11, in a preferred embodiment of the present disclosure, a stopping element 13 is disposed between the stopping portion 124 and the position-corresponding stopping portion 113 and stopped at the position-corresponding stopping portion 113. Therefore, the body portion 11 and the fastening element 12 are firmly coupled together.

Figure 12:
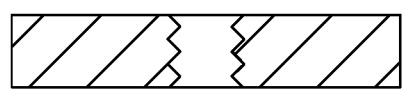
FIG. 12 is a schematic view of various forms of a fastening portion in a variant embodiment of the present disclosure.
Figure 12:
Figure 12:
Figure 12:
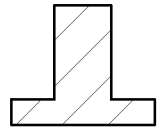
Figure 12:

Referring to FIG. 12, in a preferred embodiment of the present disclosure, the fastening portion 123 is a nut (part a of FIG. 12), outer thread (part b of FIG. 12), post (part c of FIG. 12), outer fastening member (part d of FIG. 12) or inner fastening member (part e of FIG. 12). Therefore, the fastening portion 123 meets all mounting-related needs in response to variations in the second object.

Figure 13:
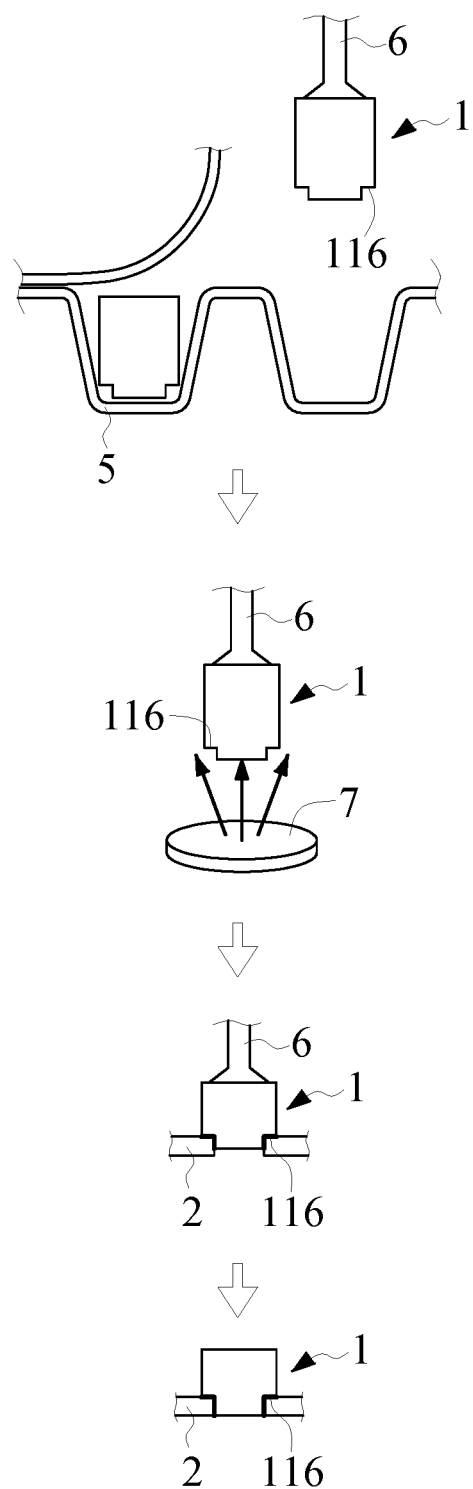
FIG. 13 is a schematic view of how to assemble the sixth embodiment of the present disclosure.

Referring to FIG. 13, in a preferred embodiment of the present disclosure, the buoyant fastener structure 1 is held in a carrier 5 but can be taken out of the carrier 5 with a tool 6 to fit to a first object 2. After being taken out with the tool 6, the buoyant fastener structure 1 to be fitted to the first object 2 has its required position computed by a position-corresponding device 7, and then information about the required position is transmitted to the tool 6 to allow the tool 6 to precisely place the buoyant fastener structure 1 at a fitting position for the first object 2.

In a preferred embodiment of the present disclosure, the position-corresponding device 7 is a vision comparison device or an image comparison device. Therefore, the position-corresponding device 7 is appropriately selected as needed to meet various usage requirements and be practical.

In a preferred embodiment of the present disclosure, the buoyant fastener structure 1 has a weldable surface 116. The first object 2 is welded to the weldable surface 116. Therefore, the buoyant fastener structure 1 and the first object 2 are firmly coupled together.

Figure 14:
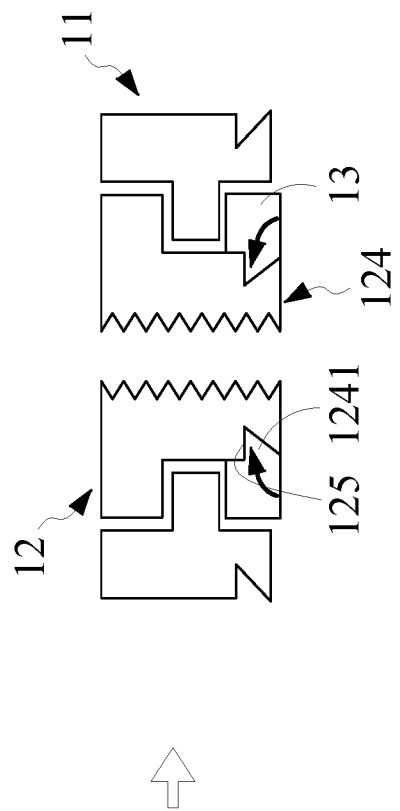
FIG. 14 is a schematic view of how to assemble the seventh embodiment of the present disclosure.
Figure 14:
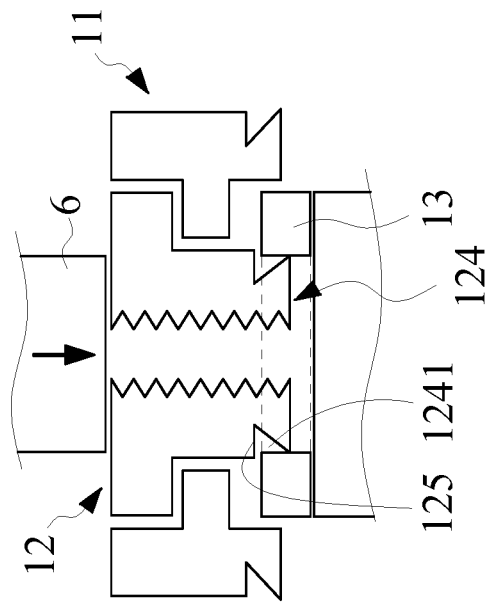

Referring to FIG. 14, in a preferred embodiment of the present disclosure, the stopping portion 124 of the fastening element 12 has a material-storage space 1241, and the fastening element 12 (or the body portion 11, not shown) has a squeezing portion 125. When a die 4 applies an applied force to the fastening element 12, the squeezing portion 125 squeezes the stopping element 13; as a result, the material of the stopping element 13 flows into or enters the material-storage space 1241, allowing the fastening element 12 to movably fit to the body portion 11. Hence, the present disclosure meets practical needs.

While the present disclosure has been described by means of specific embodiments, numerous modifications and variations could be made thereto by those skilled in the art without departing from the scope and spirit of the present disclosure set forth in the claims.

What is claimed is:

1. A buoyant fastener structure, comprising a body portion and a fastening element, the body portion having a rotation-preventing portion and a position-limiting portion, the fastening element having a position-corresponding rotation-preventing portion, a position-corresponding position-limiting portion and a fastening portion, wherein the rotation-preventing portion and the position-corresponding rotation-preventing portion prevent each other from rotating, and a rotation-preventing buoyancy level exists between the rotation-preventing portion and the position-corresponding rotation-preventing portion in a radial direction thereof, whereby the position-limiting portion and the position-corresponding position-limiting portion are movably in the radial direction, wherein a position-limiting buoyancy level from the radial direction exists between the position-limiting portion and the position-corresponding position-limiting portion, wherein the position-corresponding position-limiting portion has a stopping portion, and the body portion has a position-corresponding stopping portion, allowing the stopping portion to stop and limit the position of the position-corresponding stopping portion.

2. The buoyant fastener structure of claim 1, wherein the rotation-preventing portion is a recess which the position-corresponding rotation-preventing portion is disposed in.

3. The buoyant fastener structure of claim 1, wherein the stopping portion is deformed under an applied force to interfere with the position-corresponding stopping portion.

4. The buoyant fastener structure of claim 1, wherein a stopping element is disposed between the stopping portion and the position-corresponding stopping portion and stopped at the position-corresponding stopping portion, or the stopping portion has a stopping element stopped at the position-corresponding stopping portion.

5. The buoyant fastener structure of claim 4, wherein the stopping portion has a material-storage space, and material of the stopping element is squeezed and thus flows into or enters the material-storage space as soon as an applied force is applied to the fastening element, so as for the fastening element to movably fit to the body portion.

6. The buoyant fastener structure of claim 5, wherein the fastening element has a squeezing portion whereby the material of the stopping element is squeezed and thus flows into or enters the material-storage space.

7. The buoyant fastener structure of claim 1, wherein the body portion has a fitting portion for being fitted to a first object.

8. The buoyant fastener structure of claim 7, wherein the fitting portion is fitted to the first object by riveting, fastening, locking, expanding or welding, so as to fit the body portion to the first object.

9. The buoyant fastener structure of claim 7, wherein the fitting portion has a material-storage space, and material of the first object is squeezed and thus flows into or enters the material-storage space as soon as an applied force is applied to the body portion, so as to fit the body portion and the first object together.

10. The buoyant fastener structure of claim 9, wherein the body portion has a squeezing portion whereby the material of the first object is squeezed and thus flows into or enters the material-storage space.

11. The buoyant fastener structure of claim 7, wherein the fitting portion is deformed under an applied force and thereby engaged with the first object, so as to fit the body portion and the first object together.

12. The buoyant fastener structure of claim 1, wherein the buoyant fastener structure is held in a carrier but can be taken out of the carrier with a tool to fit to a first object.

13. The buoyant fastener structure of claim 12, wherein, after being taken out with the tool, the buoyant fastener structure to be fitted to the first object has its required position computed by a position-corresponding device, and then information about the required position is transmitted to the tool to allow the tool to precisely place the buoyant fastener structure at a fitting position for the first object.

14. The buoyant fastener structure of claim 12, wherein the buoyant fastener structure has a weldable surface for being welded to the first object.

15. A buoyant fastener structure, comprising a body portion and a fastening element, the body portion having a rotation-preventing portion and a position-limiting portion, the fastening element having a position-corresponding rotation-preventing portion, a position-corresponding position-limiting portion and a fastening portion, wherein the rotation-preventing portion and the position-corresponding rotation-preventing portion prevent each other from rotating, and a rotation-preventing buoyancy level exists between the rotation-preventing portion and the position-corresponding rotation-preventing portion in a radial direction thereof, whereby the position-limiting portion and the position-corresponding position-limiting portion are movably in the radial direction,
wherein a position-limiting buoyancy level from the radial direction exists between the position-limiting portion and the position-corresponding position-limiting portion,
wherein the body portion has a fitting portion for being fitted to a first object, the fitting portion has a material-storage space, and material of the first object is squeezed and thus flows into or enters the material-storage space as soon as an applied force is applied to the body portion, so as to fit the body portion and the first object together.

* * * * *